United States Patent [19]

Crook et al.

[11] 3,796,047
[45] Mar. 12, 1974

[54] ENGINE SUPERCHARGING AIR COOLING SYSTEM

[75] Inventors: James E. Crook, Speedway; John F. Cutler, Jr.; Jai K. Khanna, both of Indianapolis, all of Ind.

[73] Assignee: Wallace-Murray Corporation, New York, N.Y.

[22] Filed: July 5, 1972

[21] Appl. No.: 269,062

[52] U.S. Cl. ............................................. 60/612
[51] Int. Cl. ........................................... F02b 37/04
[58] Field of Search ........................................ 60/13

[56] References Cited
UNITED STATES PATENTS

| | | | |
|---|---|---|---|
| 2,877,622 | 3/1959 | Antonissen | 60/13 |
| 3,141,293 | 7/1964 | Crooks | 60/13 |
| 2,918,787 | 12/1959 | Schelp | 60/13 |
| 2,703,560 | 3/1955 | Lieberherr | 60/13 |
| 2,766,744 | 10/1956 | Steiger | 60/13 |

FOREIGN PATENTS OR APPLICATIONS

| | | | |
|---|---|---|---|
| 767,956 | 2/1957 | Great Britain | 60/13 |
| 743,219 | 1/1956 | Great Britain | 60/13 |

*Primary Examiner*—Carlton R. Croyle
*Assistant Examiner*—Warren Olsen
*Attorney, Agent, or Firm*—Cameron, Kerkam, Sutton, Stowell & Stowell

[57] ABSTRACT

Disclosed is a method and system utilizing two turbochargers (gas driven compressor) for providing compressed air at relatively cool ambient temperature to an internal combustion engine. Interposed between the two turbochargers is an air-to-air intercooler. The first turbocharger is driven by the exhaust gases from the engine to provide compressed heated fresh air to the turbine side of the second turbocharger. The intercooler acts to lower the temperature prior to entrance into the second turbocharger and the remaining heat loss occurs by turbine expansion of this air across the turbine wheel, thus providing cool fresh compressed intake air into the engine. Cooling air for the intercooler is provided by the compressor or fan portion of the second turbocharger combination through the suction of the intake air to that compressor being placed across the intercooler.

6 Claims, 1 Drawing Figure

PATENTED MAR 12 1974　　　　　　　　　　　3,796,047
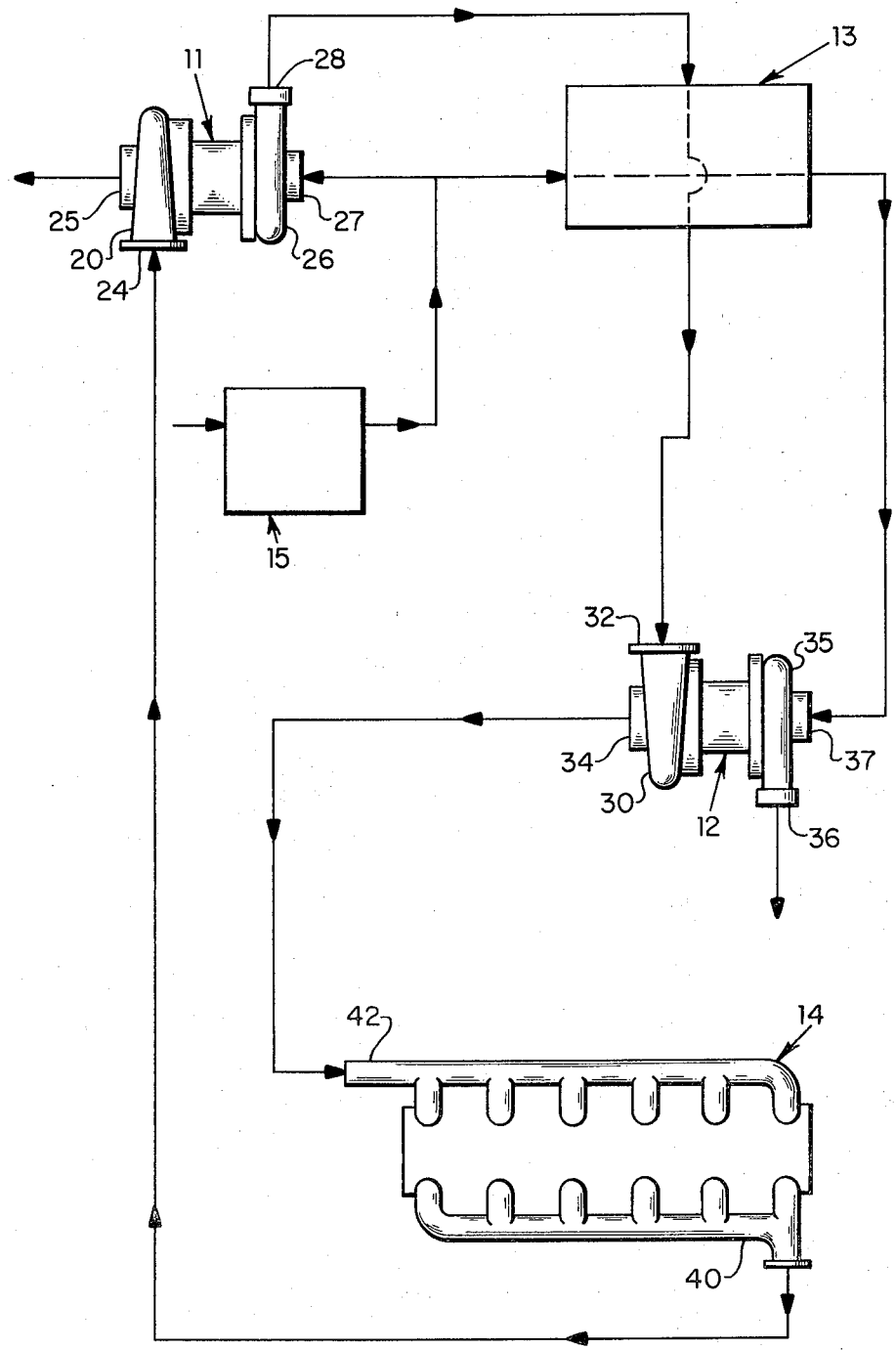

ENGINE SUPERCHARGING AIR COOLING SYSTEM

BACKGROUND OF THE INVENTION

The desirability of reducing the temperature of supercharging air before its introduction into the intake of an internal combustion engine is well known. U.S. Pat. No. 3,143,103 discloses a multi-stage turbocharger compressor having a separate axial flow stage for providing cooling air to an external heat exchanger through which passes the high pressure, high temperature air for charging the engine. The maintenance of maximum oxygen content per unit volume of charging air, as pointed out in the above mentioned patent, is an important advantage of charged air cooling; however, the more recent concern with reduction of undesirable engine exhaust emissions makes such treatment of the engine charging air a matter of increasing interest for transport and industrial diesel engine users and manufacturers. Lower combustion temperatures, in general, produce lower toxic nitrogen oxide exhaust emissions, and, since cooling the engine charging air provides lower combustion temperatures, and also provides a more dense air, providing a compact efficient charge air cooling system is a matter of growing urgency and importance. The concept of utilizing a single turbocharger assembly with a compressor housing divided into two separate collector chambers and thus creating dual flow paths through the compressor component which permits drawing cooled, ambient air through an externally located heat exchanger and then into the intake of one compressor flow path which permits this air flow to pass in heat exchange relation to the high pressure air output of the other compressor flow path is disclosed in Benisek Patent application Ser. No. 263,009, filed June 15, 1972 and assigned to the assignee of the present application. The concept of the present invention differs in that two turbocharger combinations are utilized to achieve the two discrete flow paths, including the second turbocharger which is driven by the compressed air output of the first turbocharger. This has an advantage in that it permits the first turbocharger compressor to draw air from the atmosphere and pass the high pressure output of the compressor in heat exchange relation with atmospheric cooling air flow, which is being drawn through the intercooler by the second turbocharger compressor or fan. The cooled high pressure air is then passed through the turbine component of the second turbocharger so that the turbine expansion can remove additional heat from the compressed air before it enters the intake manifold of the engine. More cooling of the engine charge air is thus achieved and the external heat exchanger can be of a minimal size.

BRIEF DESCRIPTION OF THE DRAWINGS

The drawing is a schematic illustration of the turbochargers incorporated into a system utilizing an external heat exchanger and providing for the air charging of an internal combustion engine.

DESCRIPTION OF THE PREFERRED EMBODIMENT

Referring initially to the drawing, there is illustrated an air charging system comprised of four major elements. The first of these elements is a turbocharger generally indicated by the numeral 11. The second of these elements is a second turbocharger generally indicated by the numeral 12. The element 12 is of the same configuration as the first turbocharger 11, however, it functions as an air turbine coupled with and driving a blower. The third of these elements is an intercooler generally designated as 13, interposed between turbochargers 11 and 12. The fourth of the elements is the engine, preferably a diesel engine, generally designated as 14. If desired, an air cleaner may be used in the system to filter the intake air. In the drawings such a cleaner is generally indicated by the numeral 15. Each of the turbochargers, 11 and 12, is of conventional construction such as that disclosed in U.S. Pat. No. 3,090,546 dated May 21, 1963. However, it should be understood that other forms of turbine driven fans may be utilized in place of turbocharger 12. Turbocharger 11, for example, includes a turbine housing 20 enclosing a conventional bladed turbine wheel (not shown). The turbine housing 20 is provided with a flanged inlet passage 24 which transmits engine exhaust gases emitted from the exhaust manifold 40 of engine 14 to the turbine wheel. The turbine component itself is of conventional construction.

Connected to the turbine wheel by a shaft (not shown) is a compressor wheel (not shown) which is contained within a compressor housing 26. High pressure and high temperature gases, entering the turbine housing 20 are expanded through the turbine wheel, causing the shaft and compressor wheel to rotate at high speed. The spent gases are discharged through a turbine outlet passage 25. As the compressor wheel is rotated at high speeds it will draw air through the inlet passage 27, compress the air and discharge it through the outlet passage 28. If necessary, the intake air may previously have been drawn through the air cleaner 15. The air discharged through the outlet passage 28 is then directed to one side of an air-to-air intercooler 13 through which it is passed for cooling purposes to an inlet passage 32 in a turbine housing 30. The air as it is directed into the turbine housing 30 causes the turbine wheel (not shown) in this turbine housing to rotate at high speed as a result of the expansion of the air. The air is then discharged through the turbine outlet passage 34. At this stage the air is directed to the intake 42 of the engine 14.

The turbine 30 through a shaft (not shown) drives a compressor wheel or fan contained within a housing 35 which has an outlet 36 directed to atmosphere. Thus, as the turbine 30 is operating because of the passage of air through its housing, the compressor 35 is operating simultaneously to draw cooling air through the intercooler and into an inlet 37 of the housing 35.

Beginning at the engine 14, the operation of the system is initiated by the exhaust gases which are emitted from the exhaust manifold 40 and discharged into the inlet 24 of turbine housing 20 wherein turbine expansion occurs prior to the discharge of the gases to an exhaust system and atmosphere through the outlet 25. Inasmuch as it has been found that to operate effectively and economically diesel engines of the type involved here (approximately 200 psi BMEP) should receive supercharged air at their rated speeds and loads at a maximum pressure ratio of approximately 3.0 with a minimum ratio of approximately 2.0; and inasmuch as the pressure ratio of the compressed air generated by the first turbocharger should not exceed 4.5, otherwise too much backpressure will be imposed on the engine, of this power level, and should not be less than 3.2 or insufficient air will be charged to the engine, the desired discharge air pressure ratio of the first turbocharger in this system has been determined to be approximately 3.7. As previously indicated, the operation of the turbine 20 causes a compressor 26 to be operated which draws ambient air through an inlet 27 to compress that air and discharge it through the outlet 28 at the desired pressure ratio of 3.7 and an increased temperature as a result of compression ranging from 400° to 500°F.

For greater cleanliness and long life of the engine this intake air may be drawn through an air cleaner 15 prior to its induction through the inlet 27. From the outlet 28 the higher pressure, higher temperature air is passed through an air-to-air intercooler generally illustrated at 13 from which it is discharged at an approximate temperature of 180° while still maintaining its 3.7 pressure ratio. This air is then passed into an inlet 32 of a turbine housing 30 to drive a turbine wheel (not shown) SO that turbine expansion will occur and the air will then be discharged at a desired approximate pressure ratio of 2.5 and a desired temperature of approximately 100°F. From the discharge outlet 34 the air is then directed into the intake manifold 42 of the engine 14.

When the turbine 30 is operating it in turn causes a compressor wheel or fan contained in housing 35 of the second turbocharger to turn at high speeds which thereby creates a suction at the inlet opening 37 which causes additional air to be drawn through the optional air cleaner 15 and through the air-to-air intercooler 13 before it is discharged to atmosphere through the outlet 36. The air movement created by this second air compressor or fan is the cooling air for the intercooler.

The merits of this system thus become obvious that the engine receives intake air at a normally accepted maximum pressure for such engines (approximately 200 psi BMEP) of approximately a 2.5 pressure ratio at a much lower temperature than has previously been delivered to such an engine unless extensive external cooling means were utilized.

We claim:

1. A supercharging system for an internal combustion engine having at least one air intake manifold and at least one exhaust manifold, including a first turbocharger comprising a first compressor component and a first turbine component being operatively connected through an inlet to said at least one exhaust manifold to receive exhaust gases for operating said first turbine component, said first turbine component being in driving relationship to said first compressor component, said first compressor component being operatively connected to transmit compressed air from a discharge opening through an intermediate intercooler to a second turbine component, said second turbine component being in driving relationship to a second compressor component, an inlet in said second compressor component connected to said intermediate intercooler for drawing ambient cooling air through said intercooler to cool said compressed air as it passes through said intercooler and into said second turbine component, means for transmitting air discharged from said second turbine component to said at least one air intake manifold, said second compressor discharging to ambient.

2. A system as called for in claim 1 wherein at least one air cleaner is installed to clean air to be drawn into said first compressor component and air to be drawn through said intercooler and into said second compressor component.

3. In a supercharger system for an internal combustion engine, a first turbocharger, having a turbine and a compressor, and a second turbocharger, having a turbine and a compressor, an air-to-air intercooler interposed between the first turbocharger compressor and the second turbocharger turbine, means for transmitting engine exhaust gas from said engine to the turbine of said first turbocharger, the compressor of said first turbocharger compressing ambient air and discharging said air at a first pressure ratio ranging from 3.2 to 4.5 and at a first temperature ranging from 400° to 500°F, means for transmitting said compressed air from said first turbocharger compressor through said intercooler to supply said air to the turbine of said second turbocharger at a second temperature of approximately 40% of said first temperature, said second turbine in said second turbocharger expanding said air to a final pressure ratio and final temperature considerably lower than said first pressure ratio and said second temperature, and at least double atmospheric pressure, and means for delivering said air at said final pressure ratio and said final temperature to said engine, said second turbocharger compressor drawing ambient air into said intercooler and discharging to ambient.

4. In a system as called for in claim 3, air cleaning means for cleaning ambient air brought into said system.

5. A system as called for in claim 4 wherein said first pressure ratio is approximately 3.7 and said second temperature is approximately 180°C.

6. A system as called for in claim 5 wherein said final pressure ratio is approximately 2.5 and said final temperature is approximately 100°F.

* * * * *